UNITED STATES PATENT OFFICE.

CLAYTON W. BEDFORD, OF AKRON, OHIO, ASSIGNOR TO GOODYEAR TIRE & RUBBER COMPANY, OF AKRON, OHIO, A CORPORATION OF OHIO.

ART OF VULCANIZING CAOUTCHOUC.

1,371,662. Specification of Letters Patent. Patented Mar. 15, 1921.

No Drawing. Application filed January 6, 1917. Serial No. 140,888.

*To all whom it may concern:*

Be it known that I, CLAYTON W. BEDFORD, a citizen of the United States, residing at Akron, in the county of Summit and State of Ohio, have invented a new and useful Art of Vulcanizing Caoutchouc, of which the following is a specification.

My invention relates to the art of vulcanizing or curing caoutchouc substances and to the products resulting therefrom and will be fully understood from the following specification.

The present state of the art of curing rubber, either synthetic or natural, leads to the conclusion that no practical or commercial product has ever been produced from the reaction of sulfur with caoutchouc without the aid of a nitrogen-containing body present during the vulcanization. This nitrogen body may be found in the natural rubber as obtained in latex, or may be added in the process of manufacture. The absence of all nitrogen, however, gives a vulcanization product that is of no value commercially. It has been the practice to add to the rubber before vulcanization certain nitrogen bodies which appear to have the effect of shortening the time required to cure the product and to improve its properties.

These nitrogen bodies have been known to the trade by name of "accelerators." A large number of publications may be found disclosing the utility and properties of certain specific nitrogen bodies and of certain classes or types of nitrogen bodies as accelerators, these types or classes having been classified according to their chemical constitution and reactions or by certain physical properties such as dissociation constants, etc. All of these bodies will be hereinafter included in the general term "nitrogen accelerators."

I have found that the nitrogen accelerators now known to the art are not the ultimate bodies which assist in the vulcanization of caoutchouc, but that these nitrogen accelerators must first react with sulfur and that the sulfur reaction product thus formed is the agent which either aids or is entirely responsible for the satisfactory vulcanization of the rubber with sulfur.

With these considerations in mind I have devised my present process, by which the art of vulcanizing rubber is split up into two distinct steps, i. e., first, the production of a sulfur reaction product of a nitrogen accelerator, and second, the vulcanization proper, such reaction product being incorporated in the mix. From this procedure a number of advantageous results follow. For example, the temperatures used in the vulcanization of caoutchouc are only occasionally and by the merest coincidence the temperatures most suitable for a reaction between sulfur and a nitrogen accelerator. In some cases, such, for instance, as in the use of hexamethylenetetramin, the reaction with sulfur is violent, and produces large volumes of gas including $H_2S$ and other malodorous compounds resulting in the formation of a vulcanized product which is often porous and very foul-smelling. In other instances the temperature of vulcanization is not sufficiently high to satisfactorily bring about reaction between the nitrogen accelerator and the sulfur, with the result that a substance which is in reality a good accelerator appears to be wholly inactive or does not exert its full curing power. For example, carbanilid is almost inactive at the usual vulcanization temperature corresponding to 40 pounds of steam pressure, whereas at 60 to 80 pounds pressure it shows very valuable qualities.

It is also a fact that many valuable nitrogen accelerators are regarded as commercially impractical because of the production of large volumes of gas during their reaction in the vulcanizing process, the resultant product being correspondingly porous and defective for that reason. The substance urea may be given as an example of this class of bodies. It easily reacts with sulfur under the curing temperatures and strongly accelerates the cure, but is highly disadvantageous in that the cured product is rendered porous by the liberation of gases therein during the cure.

According to my process, by which the reaction between the nitrogen accelerators and the sulfur is carried out before compounding them with the rubber, the exact temperature best suited to this particular reaction may be employed and any undesirable gaseous or other by-products which are formed may be removed before the finished reaction product is introduced into the compound or mix. It is, therefore, possible, according to the procedure of my invention, to employ many nitrogen accelerators which at present are regarded as impractical or of no commercial value, and furthermore, many of those accelerators which are now regarded as practical and valuable, give more advantageous results when employed according to my method.

The reaction between sulfur and nitrogen accelerators usually results in the liberation of gases including $H_2S$ and other volatile sulfur compounds. Such liberation of $H_2S$ from a sulfur-free nitrogen accelerator demonstrates sulfur substitution, although sulfur addition and other changes probably also occur. The resultant sulfur-nitrogen accelerators which are formed often have no basic properties, in so far as is shown by their insolubility in dilute or concentrated hydrochloric acid. The properties of my reaction products, both chemical and physical, are radically different from those of the original materials, the products being in fact frequently amorphous bodies of a composition very difficult to determine.

In many cases the curing value referred to the nitrogen content, is more than doubled (i. e., the time of cure for a given mix is cut in half), by using the sulfur reaction product of a nitrogen accelerator instead of the nitrogen accelerator itself. For example, if a mixture of one part of sulfur and 16 parts of plantation pale crape rubber cures to the best product in from 3 to 3¼ hours at a temperature corresponding to 40 pounds of steam pressure, and the addition of one-half part of a nitrogen accelerator, such, for instance, as thiocarbanilid shortens the time for the best cure to 1¾ hours, this accelerator when caused to react with the correct proportion of sulfur (as will hereafter appear), forms a sulfur nitrogen product which, when used, weight for weight, in place of thiocarbanilid in the above mix, shortens the time of cure to one hour or even 45 minutes. This shortened time required for the cure benefits the product, as evidence by the higher tensile strength and higher modulus of elasticity, or higher "quality figure." By shortening the time of cure the output of a given curing equipment is also increased. It is only in rare instances that increase in the amount of nitrogen accelerator used (according to the heretofore known methods) will equal in time of cure and quality of product the results obtainable by using the sulfur reaction product of the accelerator.

My preferred method for producing a sulfur-nitrogen accelerator from thiocarbanilid, for example, is as follows, the following ingredients being used:

910 parts thiocarbanilid.
514 parts sulfur.
744 parts anilin.

The mixture is brought to a boil under an efficient reflux condenser, and the temperature of the liquid gradually raised to 190° C. This temperature is held until 133 parts (by weight) of gas have passed through the condenser. The liquid is now distilled quickly with as little refluxing as is possible until 787 parts of anilin have been removed. If, at this point, the total gas loss has not reached 190 to 200 parts, a reflux condenser is again applied to the still and distillation with refluxing continued until the gas loss reaches the figure given. The temperature at the end of the distillation of the anilin or at the end of the final refluxing process when the latter is used should reach but not exceed 270° C. The reaction is now complete and the reaction product suitable for use in the rubber mix. In the reaction above described it is obvious that, in accordance with the known laws of chemical action, the reaction product of thiocarbanilid and anilin, namely, triphenylguanidin, will be produced, at least, initially. This product will necessarily react in its turn with the sulfur present in the mixture, producing a sulfur-nitrogen accelerator, which will form a substantial portion of the final product of the reaction.

Methylene-diphenyldiamin may be substituted for thiocarbanilid in the foregoing specific process, the procedure followed being the same in both cases.

As a further example of the process the following may be mentioned; 108 parts paraphenylenediamin are mixed with 32 parts of sulfur. The mixture is melted together, being constantly stirred, and brought to a temperature of 180° to 200° C., care being exercised to prevent local over-heating. After the vigorous reaction has subsided and the evolution of gas has dropped to a minimum, the re-action product is cooled, ground and sifted.

According to my invention, therefore, an entirely new class of nitrogen compounds is made use of for the purpose of bringing about the vulcanization of caoutchouc, these compounds being the reaction products of sulfur with nitrogen accelerators, such reaction products being obtained independently of the vulcanization process both as regards time and place, temperature, proportions of ingredients or reactive substances, and all other conditions. This new class of accelerators I identify by the term "sulfur-nitrogen accelerators," that is, reaction products of elemental sulfur and nitrogen-containing bodies of the class or classes known as accelerators. By the term "nitrogen accelerators" as employed herein, I wish it to be understood, however, that I intend to define all of those nitrogen-containing bodies, the properties of which are such that they tend to enter into reaction with sulfur in a rubber mix as the result of which vulcanization of the mix is effected or expedited. As I have pointed out, many substances are inherently accelerators within this broad sense, which would not be so regarded in the present state of the art, for the reason that their accelerating effect could not be obtained under the temperature and other limitations of the vulcanizing process *per se*. It is a fact that certain hitherto known accelerators, such as thiocarbanilid, include sulfur in their composition. I do not intend to include such accelerators within the term "sulfur nitrogen accelerators" unless present as a constituent of a product formed according to my process as hereinbefore described. I do, however, include within this term the products formed by causing elemental sulfur to react with thiocarbanilid or the like, such reaction product being distinctly different both chemically and physically from the original accelerator.

In addition to the amino bodies, secondary amins and imins, such as the specific nitrogen accelerators heretofore mentioned, I find that nitroso bodies, such as paranitroso-dimethylanilin, cyanid bodies, such as sodium ferrocyanid, and proteids and the products of their decomposition and hydrolysis, including the amido acids, and such, for instance, as animal glue or gelatin, give advantageous results when employed according to my process. It will be evident that in preparing the sulfur-nitrogen accelerator of my invention, it is not necessary to limit the amount of sulfur to that required for reaction with the nitrogen-accelerator. Although this is in some respects advantageous, it is permissible to admix the entire amount of sulfur to be used for vulcanization with the nitrogen accelerator.

While I have described in considerable detail the theories which underlie my present invention and have given certain specific examples of procedure and materials to be employed, it will be understood that I do not regard the invention as dependent upon the soundness or accuracy of such theories, nor as limited to the specific procedure or materials mentioned, except in so far as such limitations are included within the terms of the accompanying claims, in which it is my intention to claim all novelty inherent in my invention as broadly as is permissible in view of the prior art.

What I claim as new and desire to secure by Letters Patent is:—

1. The process of effecting the curing of rubber which consists in first bringing together under reacting conditions sulfur and a nitrogen accelerator to produce a sulfur-nitrogen accelerator, and subsequently incorporating the sulfur-nitrogen accelerator in the caoutchouc mix and vulcanizing the same.

2. The process of effecting the curing of rubber which consists in first bringing together under re-acting conditions sulfur and a thiocarbanilid, or derivative thereof to produce a sulfur-nitrogen accelerator, and subsequently incorporating the sulfur-nitrogen accelerator in the caoutchouc mix and vulcanizing the same.

3. The process of effecting the curing of rubber which consists in incorporating into a rubber mix a sulfur-nitrogen accelerator formed by bringing together under re-acting conditions sulfur and a nitrogen accelerator, and heating the resultant mixture with a vulcanizing agent to effect vulcanization.

4. The process of effecting the curing of rubber which consists in incorporating into a rubber mix a sulfur-nitrogen accelerator formed by bringing together under reacting conditions sulfur and a thiocarbanilid or derivative thereof, and heating the resultant mixture with a vulcanizing agent to effect vulcanization.

5. The vulcanized caoutchouc product formed by the reaction of caoutchouc, a vulcanizing agent, and a sulfur nitrogen accelerator.

6. The process of effecting the curing of rubber which consists in first bringing together under reacting conditions sulfur and a nitrogen accelerator in the presence of an aromatic amin to produce a sulfur nitrogen accelerator, and subsequently incorporating the sulfur nitrogen accelerator in the caoutchouc mix and vulcanizing the same.

7. The process of effecting the curing of rubber which consists in first bringing together under reacting conditions sulfur and a nitrogen accelerator in the presence of anilin to produce a sulfur nitrogen accelerator, and subsequently incorporating the sulfur nitrogen accelerator in the caoutchouc mix and vulcanizing the same.

8. The process of effecting the curing of rubber which consists in first bringing together under reacting conditions sulfur and a guanidin derivative to produce a sulfur nitrogen accelerator, and subsequently incorporating the sulfur nitrogen accelerator in the caoutchouc mix and vulcanizing the same.

9. The process of effecting the curing of rubber which consists in first bringing together under reacting conditions sulfur and triphenyl guanidin to produce a sulfur nitrogen accelerator, and subsequently incorporating the sulfur nitrogen accelerator in the caoutchouc mix and vulcanizing the same.

10. The process of curing rubber which consists in incorporating into a rubber mix a sulfur-nitrogen accelerator formed by bringing together under reacting conditions sulfur and a nitrogen accelerator in the presence of an aromatic amin, and heating the resultant mixture with a vulcanizing agent to effect vulcanization.

11. The process of curing rubber which consists in incorporating into a rubber mix a sulfur-nitrogen accelerator formed by bringing together under reacting conditions sulfur and a nitrogen accelerator in the presence of anilin, and heating the resultant mixture with a vulcanizing agent to effect vulcanization.

12. The process of curing rubber which consists in incorporating into a rubber mix a sulfur-nitrogen accelerator formed by bringing together under reacting conditions sulfur and a guanidin derivative, and heating the resulting mixture with a vulcanizing agent to effect vulcanization.

13. The process of curing rubber which consists in incorporating into a rubber mix a sulfur-hydrogen nitrogen accelerator formed by bringing together under reacting conditions sulfur and triphenyl guanidin, and heating the resulting mixture with a vulcanizing agent to effect vulcanization.

14. The process of curing rubber which consists of incorporating into a rubber mix a sulfur-nitrogen accelerator formed by bringing together under reacting conditions sulfur and a nitrogen accelerator in the presence of a solvent and heating the resultant mix with a vulcanizing agent to effect vulcanization.

15. The process of curing rubber which consists in incorporating into a rubber mix a sulfur-nitrogen accelerator formed by bringing together under reacting conditions sulfur and a thiocarbanilid or derivative thereof in the presence of a solvent and heating the resultant mix with a vulcanizing agent to effect vulcanization.

In testimony whereof I have signed my name in the presence of two subscribing witnesses.

CLAYTON W. BEDFORD.

Witnesses:
B. J. McDanel,
L. E. Wagner.